(12) United States Patent
Tokura et al.

(10) Patent No.: US 10,401,850 B2
(45) Date of Patent: Sep. 3, 2019

(54) VEHICLE REMOTE OPERATION SYSTEM

(71) Applicant: TOYOTA JIDOSHA KABUSHIKI KAISHA, Toyota (JP)

(72) Inventors: Takaaki Tokura, Nagoya (JP); Naoya Ishizaki, Sunto (JP); Tomoharu Maeda, Toyota (JP); Yushi Seki, Susono (JP); Hiroshi Majima, Toyota (JP); Katsuya Terahata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/213,710

(22) Filed: Dec. 7, 2018

(65) Prior Publication Data

US 2019/0179302 A1   Jun. 13, 2019

(30) Foreign Application Priority Data

Dec. 8, 2017   (JP) .................................. 2017-236502

(51) Int. Cl.
| | |
|---|---|
| *G05D 1/00* | (2006.01) |
| *B60W 50/08* | (2012.01) |
| *G07C 5/08* | (2006.01) |
| *G05B 15/02* | (2006.01) |

(52) U.S. Cl.
CPC ............ *G05D 1/0011* (2013.01); *G05B 15/02* (2013.01); *G07C 5/08* (2013.01); *B60W 50/087* (2013.01); *G05D 1/0016* (2013.01); *G05D 1/0027* (2013.01); *G05D 2201/0212* (2013.01)

(58) Field of Classification Search
CPC .. G05D 1/0011; G05D 1/0016; G05D 1/0027; G05D 2201/0212; B60W 50/087
See application file for complete search history.

(56) References Cited

U.S. PATENT DOCUMENTS

| | | | |
|---|---|---|---|
| 9,110,468 B2 * | 8/2015 | Funke | ...................... G07C 3/00 |
| 9,261,042 B2 | 2/2016 | Sakaguchi et al. | |
| 9,821,804 B2 * | 11/2017 | D'Amato | ............ B60W 30/143 |
| 10,101,742 B2 * | 10/2018 | Prokhorov | .......... B60W 30/143 |
| 2019/0011910 A1 * | 1/2019 | Lockwood | ........... G05D 1/0038 |

FOREIGN PATENT DOCUMENTS

| | | |
|---|---|---|
| JP | 2009-129052 A | 6/2009 |
| JP | 2011-232047 A | 11/2011 |
| JP | 2012-1027 A | 1/2012 |
| JP | 2014-71655 A | 4/2014 |
| JP | 2017-174208 A | 9/2017 |

\* cited by examiner

*Primary Examiner* — Todd M Melton
(74) *Attorney, Agent, or Firm* — Oblon, McClelland, Maier & Neustadt, L.L.P.

(57) ABSTRACT

A vehicle remote operation system includes a controller correcting a map, which indicates a relationship between an operation amount of a reference vehicle and an operation amount of a vehicle to be operated, based on vehicle characteristic data of the vehicle to be operated, characteristic of the operation device being determined based on characteristic of an operation device of the reference vehicle, correcting an operation amount, which is indicated by the operation signal, in accordance with a characteristic of the vehicle to be operated by using the corrected map, and outputting a control signal indicating the corrected operation amount to the vehicle to be operated so that the vehicle to be operated can be operated in accordance with the corrected operation amount.

2 Claims, 3 Drawing Sheets

VEHICLE REMOTE OPERATION SYSTEM

CROSS-REFERENCE TO RELATED APPLICATION(S)

The present application claims priority to and incorporates by reference the entire contents of Japanese Patent Application No. 2017-236502 filed in Japan on Dec. 8, 2017.

BACKGROUND

The present disclosure relates to a vehicle remote operation system that performs.

Japanese Laid-open Patent Publication No. 2017-174208 describes a technology of performing remote operation of a self-driving vehicle when traveling by self-driving becomes impossible due to an unexpected circumstance in a system of performing a taxi service by using a self-driving vehicle.

Generally, in a case of performing remote operation of various vehicles with different specifications, power performance, and traveling histories, it is necessary for an operator to perform remote operation of the vehicles in consideration of different characteristics of the vehicles to be operated. However, in the technology described in Japanese Laid-open Patent Publication No. 2017-174208, remote operation of a self-driving vehicle is not performed in consideration of a characteristic of the self-driving vehicle to be operated when traveling by self-driving becomes impossible. Thus, according to the technology described in Japanese Laid-open Patent Publication No. 2017-174208, contents of remote operation by an operator do not correspond to a characteristic of a self-driving vehicle to be operated, and there is a possibility that a passenger of the self-driving vehicle feels excessive acceleration/deceleration.

SUMMARY OF THE INVENTION

There is a need for providing a remote operation system for a vehicle preventing a passenger of the vehicle from feeling excessive acceleration/deceleration.

According to an embodiment, a vehicle remote operation system, which selects a vehicle to be operated from a plurality of vehicles and inputs an operation signal indicating an operation amount of the selected vehicle by using an operation device outside the vehicles to perform a remote operation of the selected vehicle, includes: a controller correcting a map, which indicates a relationship between an operation amount of a reference vehicle and an operation amount of the vehicle to be operated, based on vehicle characteristic data of the vehicle to be operated wherein characteristic of the operation device is determined based on characteristic of an operation device of the reference vehicle, correcting the operation amount, which is indicated by the operation signal, in accordance with a characteristic of the vehicle to be operated by using the corrected map, and outputting a control signal indicating the corrected operation amount to the vehicle to be operated so that the vehicle to be operated can be operated in accordance with the corrected operation amount.

DETAILED DESCRIPTION

In the following, a configuration and operation of a vehicle remote operation system according to an embodiment of the present disclosure will be described with reference to the accompanying drawings.

Configuration

Figure 1:
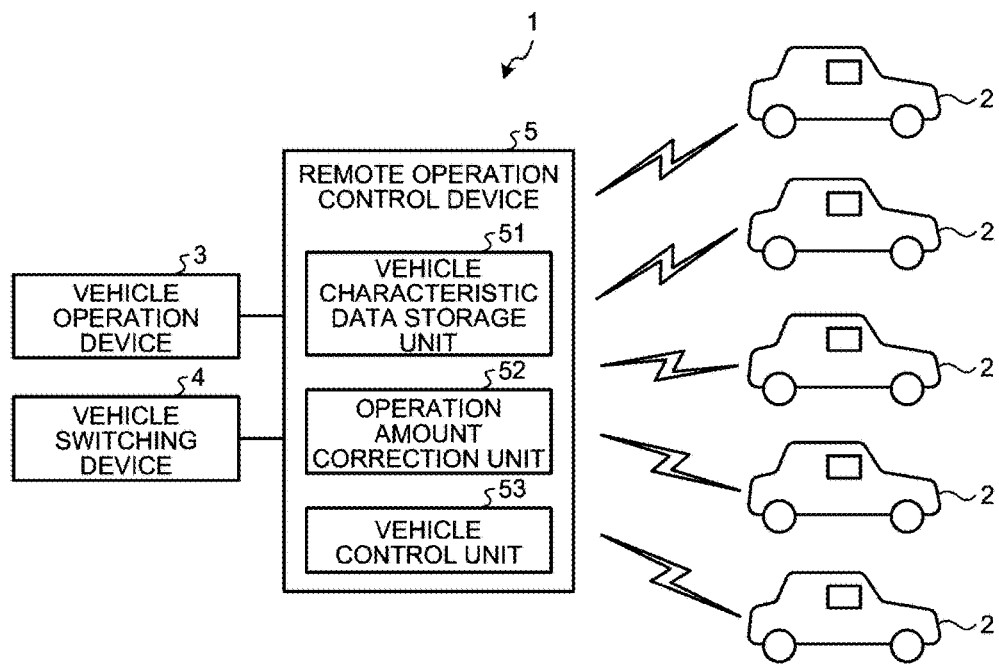
FIG. 1 is a schematic view illustrating an example configuration of a vehicle remote operation system according to an embodiment of the present disclosure.
Figure 2:
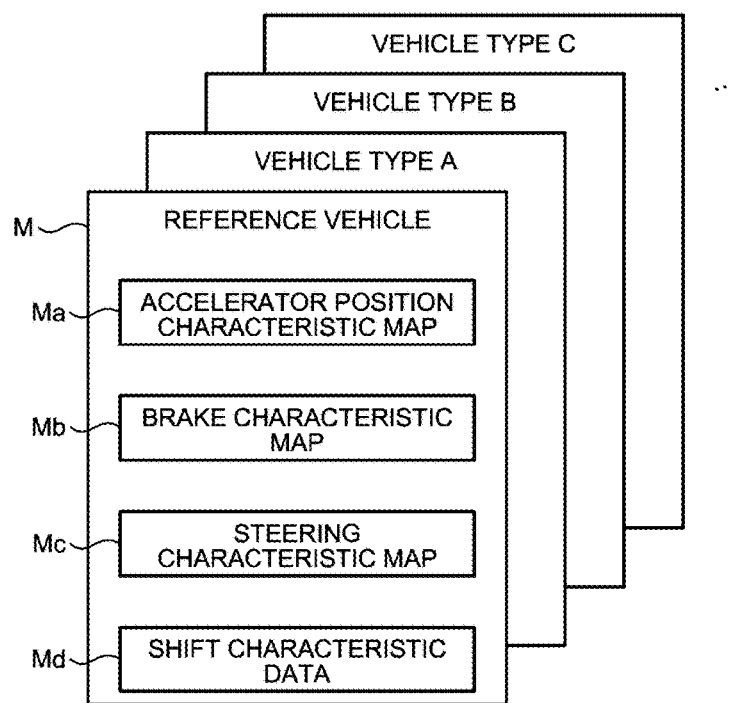
FIG. 2 is a schematic view illustrating an example of vehicle characteristic data stored in a vehicle characteristic data storage unit illustrated in FIG. 1.

First, a configuration of the vehicle remote operation system according to an embodiment of the present disclosure will be described with reference to FIG. 1 and FIG. 2. FIG. 1 is a schematic view illustrating an example configuration of the vehicle remote operation system according to an embodiment of the present disclosure. FIG. 2 is a schematic view illustrating an example of vehicle characteristic data stored in a vehicle characteristic data storage unit 51 illustrated in FIG. 1.

As illustrated in FIG. 1, a vehicle remote operation system 1 according to an embodiment of the present disclosure selects a vehicle 2 to be operated from a plurality of vehicles 2 and inputs an operation signal indicating an operation amount of the selected vehicle 2 to perform a remote operation of the selected vehicle 2, and includes a vehicle operation device 3, a vehicle switching device 4, and a remote operation control device 5 as main components thereof.

The vehicle operation device 3, provided on a side of an operator to perform remote operation of the vehicle 2, includes an operation device, which is provided in a general vehicle, such as an accelerator pedal, a brake pedal, a steering, and a shift lever. In response to an operation input from the operator, the vehicle operation device 3 outputs an operation signal indicating an operation amount of the vehicle 2 to be operated to the remote operation control device 5. Note that characteristics of the accelerator pedal, the brake pedal, the steering, and the shift lever included in the vehicle operation device 3 are determined on the basis of characteristics of an accelerator pedal, a brake pedal, a steering, and a shift lever of a predetermined reference vehicle (hereinafter may be simplified as a "reference vehicle"). In addition, in the vicinity of the vehicle operation device 3, a display device or a virtual reality (VR) device that displays the vehicle 2 to be operated or a peripheral image thereof two-dimensionally or three-dimensionally is arranged in such a manner that the operator can recognize a state of the vehicle 2 to be operated and peripheral environment thereof.

The vehicle switching device 4, provided on the side of the operator, outputs information of a vehicle 2, which is selected from a plurality of vehicles 2 according to a selection operation input by the operator, as information of the vehicle 2 to be operated, to the remote operation control device 5.

The remote operation control device 5 includes an information processing device such as a computer and is connected to the plurality of vehicles 2 in a manner of being able to perform information communication through an electric communication line such as the Internet. The remote operation control device 5 includes a vehicle characteristic data storage unit 51, an operation amount correction unit 52, and a vehicle control unit 53 as main components thereof.

The vehicle characteristic data storage unit 51 includes a non-volatile storage device such as a Read Only Memory (ROM) inside the information processing device. Note that a storage device arranged outside the remote operation control device 5 may be used as the vehicle characteristic data storage unit 51, so that vehicle characteristic data can be acquired from the external storage device through the electric communication line when necessary. The vehicle characteristic data storage unit 51 stores vehicle characteristic data for the reference vehicle and each vehicle type of the vehicle 2 to be operated.

More specifically, as illustrated in FIG. 2, the vehicle characteristic data storage unit 51 stores, as vehicle characteristic data, a vehicle characteristic data map M including an accelerator position characteristic map Ma, a brake characteristic map Mb, a steering characteristic map Mc, and shift characteristic data Md for the reference vehicle and each vehicle type of the vehicle 2 to be operated in the present embodiment. Here, the accelerator position characteristic map Ma indicates a relationship between an operation amount of an accelerator pedal and an accelerator position. The brake characteristic map Mb indicates a relationship between an operation amount of a brake pedal and a brake characteristic. The steering characteristic map Mc indicates a relationship between a steering angle of a steering and a steering characteristic. The shift characteristic data Md indicates a configuration of a shift device (such as six-speed transmission configuration or four-speed transmission configuration).

Functions of the operation amount correction unit 52 and the vehicle control unit 53 will be described later. Note that each of the operation amount correction unit 52 and the vehicle control unit 53 may be realized by execution of a computer program by an arithmetic processing device such as a Central Processing Unit (CPU) inside the information processing device or may be realized by a special electronic circuit.

The vehicle remote operation system 1 having such a configuration prevents a passenger of the vehicle 2 from feeling excessive acceleration/deceleration by executing remote operation control process described in the following. In the following, an operation of the vehicle remote operation system 1 of when the remote operation control process according to an embodiment of the present disclosure is executed will be described with reference to FIG. 3 and FIGS. 4A and 4B.

Remote Operation Control Process

Figure 3:
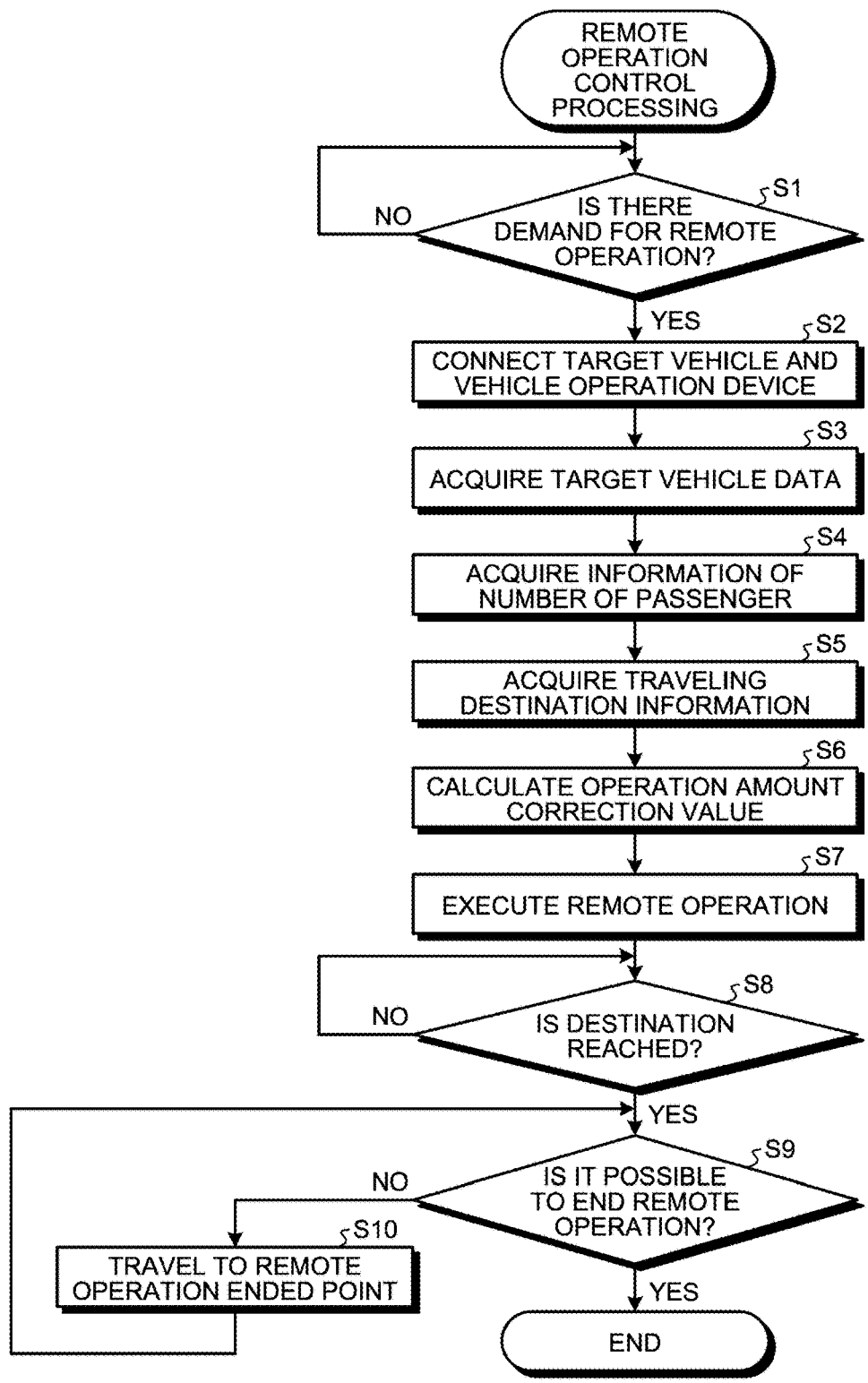
FIG. 3 is a flowchart illustrating a flow of remote operation control process according to an embodiment of the present disclosure.
Figure 4A:
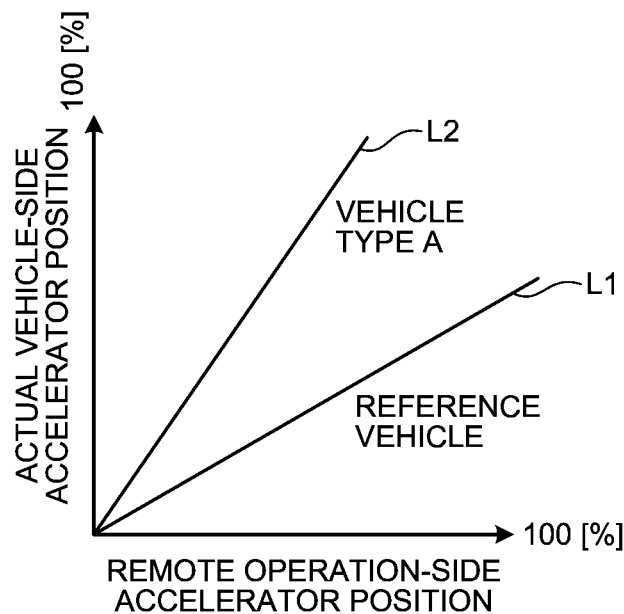
FIGS. 4A and 4B are views illustrating an operation amount correction value calculation process illustrated in FIG. 3.
Figure 4B:
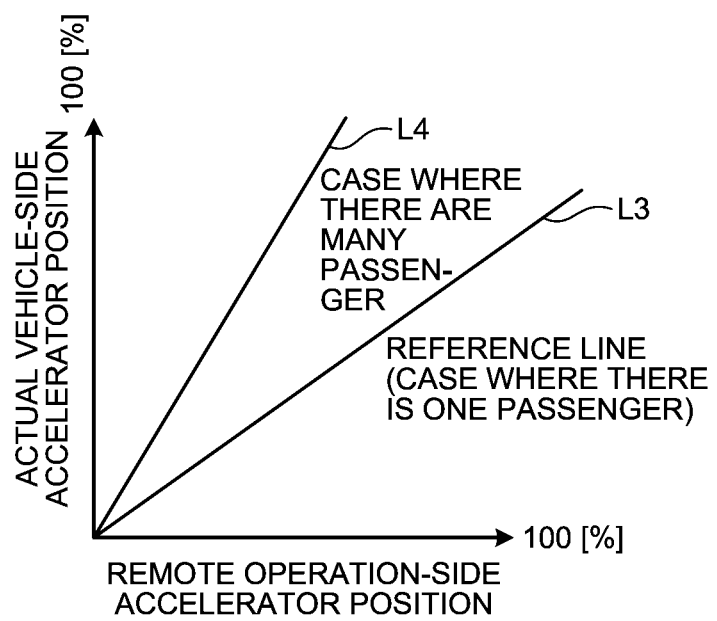

FIG. 3 is a flowchart illustrating a flow of the remote operation control process according to an embodiment of the present disclosure. FIGS. 4A and 4B are views illustrating operation amount correction value calculation process illustrated in FIG. 3.

The process of the flowchart of FIG. 3 starts when the vehicle remote operation system 1 is activated, and the remote operation control process goes to step S1.

In step S1, the remote operation control device 5 determines whether a request signal for the remote operation is received from the vehicle 2 through the electric communication line to determine whether there is a demand for remote operation from a passenger of a vehicle 2. As a result of this determination, in a case where a request signal for the remote operation is received (Yes in step S1), the remote operation control device 5 determines that there is a demand for the remote operation and advances the remote operation control process to step S2. On the other hand, in a case where a request signal for the remote operation is not received (No in step S1), the remote operation control device 5 determines that there is no demand for the remote operation and returns to step S1 after standing by for a predetermined period.

In step S2, the remote operation control device 5 connects the vehicle 2, which transmits the request signal for the remote operation through the electric communication line (hereinafter, referred to as a "vehicle to be operated"), and the vehicle operation device 3. Accordingly, the process of step S2 ends and the process goes to step S3.

In the process of step S3, the remote operation control device 5 acquires, as target vehicle data, information of a vehicle type or a traveling history of the vehicle to be operated from the vehicle to be operated through the electric communication line. The remote operation control device 5 may acquire the target vehicle data by reading the target vehicle data from a storage device included in the vehicle to be operated or may acquire the target vehicle data by prompting a passenger of the vehicle to be operated to input the target vehicle data. Accordingly, the process of step S3 ends, and the process goes to step S4.

In the process of step S4, the remote operation control device 5 acquires information of the number of passengers in the vehicle to be operated (information of number of passenger) from the vehicle to be operated through the electric communication line. The remote operation control device 5 can acquire the information of the number of passengers by, for example, prompting the passenger of the vehicle to be operated to input the information of the number of passengers. Accordingly, the processing in Step S4 ends, and the process goes to step S5.

In step S5, the remote operation control device 5 acquires information of a destination of the vehicle to be operated (traveling destination information) from the vehicle to be operated through the electric communication line. The remote operation control device 5 can acquire the traveling destination information by, for example, prompting the passenger of the vehicle to be operated to input the traveling destination information. Accordingly, the process of step S5 ends, and the process goes to step S6.

In the process of step S6, the operation amount correction unit 52 reads, from the vehicle characteristic data storage unit 51, the vehicle characteristic data corresponding to the reference vehicle and the target vehicle data acquired by the process in step S3 and corrects, on the basis of the read vehicle characteristic data, a map indicating a relationship between an operation amount of the reference vehicle and an operation amount of the vehicle to be operated. More specifically, as illustrated in FIG. 4A, in a case where a relationship between a remote operation-side accelerator position and an actual vehicle-side accelerator position of when a vehicle type of the vehicle to be operated is the same with that of the reference vehicle is expressed by a reference line L1 and a case where the vehicle type of the vehicle to be operated is a vehicle type A, the operation amount correction unit 52 creates a map in which the reference line L1 is corrected to a correction line L2 on the basis of accelerator position characteristic maps Ma of the reference vehicle and the vehicle to be operated. Similarly, the operation amount correction unit 52 corrects a brake characteristic, a steering characteristic, and a shift characteristic according to the vehicle type of the vehicle to be operated. Subsequently, on the basis of the information of the number of passengers acquired by the process of step S4, the operation amount correction unit 52 further corrects the map indicating a relationship between an operation amount of the reference vehicle and an operation amount of the vehicle to be operated. More specifically, as illustrated in FIG. 4B, in a case where a relationship between a remote operation-side accelerator position and an actual vehicle-side accelerator position of when the number of passengers is one is expressed by a reference line L3, the operation amount correction unit 52 creates a map in which the reference line L3 is corrected to a correction line L4 on the basis of the information of the number of passengers in such a manner that an accelerator position becomes large as the number of passengers is increased. Similarly, the operation amount correction unit 52 further corrects the brake characteristic according to the information of the number of passengers. Note that the operation amount correction unit 52 may correct a map in consideration of a traveling history of the vehicle to be operated. Accordingly, the process of step S6 ends, and the process goes to step S7.

In the process of step S7, the operator operates the vehicle operation device 3 and inputs an operation signal indicating an operation amount of the reference vehicle. Then, the operation amount correction unit 52 corrects the operation amount, which is indicated by the input operation signal, according to a characteristic of the vehicle to be operated by using the map corrected in step S6. The vehicle control unit 53 performs remote operation of the vehicle to be operated by outputting a control signal indicating the corrected operation amount to the vehicle to be operated in such a manner that operation is performed according to the corrected operation amount. Accordingly, the process of step S7 ends, and the process goes to step S8.

In step S8, the remote operation control device 5 determines whether the vehicle to be operated arrives at a destination on the basis of the traveling destination information acquired in step S5. As a result of the determination, in a case where the vehicle to be operated arrives at the destination (Yes in step S8), the remote operation control device 5 advances the remote operation control process to step S9. On the other hand, in a case where the vehicle to be operated does not arrive at the destination (No in step SB), the remote operation control device 5 executes the process of step S8 again after standing by for a predetermined period.

In step S9, the remote operation control device 5 determines whether it is possible to end the remote operation of the vehicle to be operated by determining whether the vehicle to be operated is a position where stopping/parking is possible. As a result of the determination, in a case where the vehicle to be operated is in a position where stopping/parking is possible (Yes in step S9), the remote operation control device 5 determines that the remote operation can be terminated and ends the series of remote operation control process. On the other hand, in a case where the vehicle to be operated is not in a position where stopping/parking is possible (No in step S9), the remote operation control device 5 determines that the remote operation cannot be terminated and advances the process to step S10.

In step S10, the operator operates the vehicle operation device 3 and makes the vehicle to be operated travel to a remote operation ended point such as a position where stopping/parking is possible. Accordingly, the process of step S10 ends, and the process goes back to step S9.

As it is apparent from the above description, in the remote operation control process according to an embodiment of the present disclosure, the remote operation control device 5 corrects, according to a characteristic of a vehicle to be operated, an operation amount indicated by an operation signal input from the vehicle operation device 3, and outputs a control signal indicating the corrected operation amount to the vehicle to be operated in such a manner that operation is performed according to the corrected operation amount. Then, according to such a configuration, an operator can perform remote operation of a vehicle to be operated as if he/she constantly operates a reference vehicle without changing an operation amount for each vehicle to be operated. Thus, it is possible to prevent a passenger of the vehicle to be operated from feeling excessive acceleration/deceleration. Further, since one operator can perform remote operation of a plurality of vehicles by switching a vehicle to be operated by the remote operation, it is possible to reduce the number of standby vehicles such as a taxi and to reduce an amount of $CO_2$ emission.

Furthermore, the remote operation control device 5 corrects an operation amount in such a manner that an accelerator position of a vehicle to be operated increases as the number of passengers (load capacity) of the vehicle to be operated increases. Then, according to such a configuration, an operator can perform remote operation of a vehicle to be operated without changing an operation amount according to the number of passengers in the vehicle to be operated. Thus, it is possible to further prevent a passenger of the vehicle to be operated from feeling excessive acceleration/deceleration.

According to an embodiment, since an operator can perform remote operation of a vehicle without changing an operation amount according to load capacity of the vehicle, it is possible to further prevent a passenger of the vehicle from feeling excessive acceleration/deceleration.

According to a vehicle remote operation system of the present disclosure, since an operator can perform remote operation of a vehicle without changing an operation amount for each vehicle to be operated, it is possible to prevent a passenger of the vehicle from feeling excessive acceleration/deceleration.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle remote operation system which selects a vehicle to be operated from a plurality of vehicles and inputs an operation signal indicating an operation amount of the selected vehicle by using an operation device outside the vehicles to perform a remote operation of the selected vehicle, the vehicle remote operation system comprising:
   a controller configured to
      correct a map, which indicates a relationship between an operation amount of a reference vehicle and an operation amount of the vehicle to be operated, based on vehicle characteristic data of the vehicle to be operated wherein characteristic of the operation device is determined based on characteristic of an operation device of the reference vehicle,
      correct the operation amount, which is indicated by the operation signal, in accordance with a characteristic of the vehicle to be operated by using the corrected map, and
      output a control signal indicating the corrected operation amount to the vehicle to be operated so that the vehicle to be operated can be operated in accordance with the corrected operation amount.

2. The vehicle remote operation system according to claim 1, wherein the controller is configured to correct the operation amount in such a manner that an accelerator position of the vehicle to be operated increases as load capacity of the vehicle to be operated increases.

\* \* \* \* \*